(12) United States Patent  
Smith

(10) Patent No.: US 7,657,599 B2  
(45) Date of Patent: Feb. 2, 2010

(54) SYSTEMS AND METHODS FOR AUTOMATICALLY UPDATING ELECTRONIC MAIL ACCESS LISTS

(75) Inventor: Steven J. Smith, San Francisco, CA (US)

(73) Assignee: Mindshare Design, Inc., San Francisco, CA (US)

( * ) Notice: Subject to any disclaimer, the term of this patent is extended or adjusted under 35 U.S.C. 154(b) by 900 days.

(21) Appl. No.: 10/447,593

(22) Filed: May 29, 2003

(65) Prior Publication Data

US 2004/0243678 A1 Dec. 2, 2004
US 2008/0120378 A2 May 22, 2008

(51) Int. Cl.
G06F 15/16 (2006.01)
G06F 12/14 (2006.01)

(52) U.S. Cl. .......................................... 709/206; 726/6
(58) Field of Classification Search ................. 709/206; 726/6
See application file for complete search history.

(56) References Cited

U.S. PATENT DOCUMENTS

| | | | |
|---|---|---|---|
| 4,723,212 A | 2/1988 | Mindrum et al. |
| 5,377,354 A | 12/1994 | Scannell et al. |
| 5,424,724 A | 6/1995 | Williams et al. |
| 5,487,100 A | 1/1996 | Kane |
| 5,502,636 A | 3/1996 | Clarke |
| 5,504,897 A | 4/1996 | Gans et al. |
| 5,619,648 A | 4/1997 | Canale et al. |
| 5,740,549 A | 4/1998 | Reilly et al. |
| 5,761,662 A | 6/1998 | Dasan |
| 5,793,497 A | 8/1998 | Funk |
| 5,793,972 A | 8/1998 | Shane |
| 5,797,128 A | 8/1998 | Birnbaum |
| 5,819,261 A | 10/1998 | Takahashi et al. |
| 5,835,762 A | 11/1998 | Gans et al. |
| 5,862,325 A | 1/1999 | Reed et al. |
| 5,864,684 A | 1/1999 | Nielsen |
| 5,893,099 A | 4/1999 | Schreiber et al. |
| 5,903,723 A | 5/1999 | Beck et al. |
| 5,919,247 A | 7/1999 | Van Hoff et al. |
| 5,930,479 A | 7/1999 | Hall |
| 5,937,162 A | 8/1999 | Funk et al. |
| 5,944,787 A | 8/1999 | Zoken |
| 5,948,061 A | 9/1999 | Merriman et al. |
| 5,970,469 A | 10/1999 | Scroggie et al. |
| 5,990,886 A | 11/1999 | Serdy et al. |
| 5,999,932 A | 12/1999 | Paul |

(Continued)

OTHER PUBLICATIONS

U.S. Appl. No. 10/389,419, filed Mar. 14, 2003, Steven J. Smith et al.

(Continued)

Primary Examiner—Larry D Donaghue
(74) Attorney, Agent, or Firm—Fliesler Meyer LLP

(57) ABSTRACT

A system and method for permitting a sender to provide electronic mail (email) to a recipient, said method comprising providing a recipient email address to the sender; requesting of the recipient that the sender be allowed to send email to the recipient; determining whether the request is acceptable based on at least one of: 1) a sender identity verification method; 2) user input; and 3) third party information; adding the sender to an email access list if the request is acceptable; and wherein the email access is used to determine whether or not email from the sender is permitted to reach the recipient.

46 Claims, 6 Drawing Sheets

U.S. PATENT DOCUMENTS

| | | | |
|---|---|---|---|
| 5,999,967 | A | 12/1999 | Sundsted |
| 6,014,634 | A | 1/2000 | Scroggie et al. |
| 6,023,723 | A | 2/2000 | McCormick et al. |
| 6,038,668 | A | 3/2000 | Chipman et al. |
| 6,044,205 | A | 3/2000 | Reed et al. |
| 6,044,395 | A | 3/2000 | Costales et al. |
| 6,052,709 | A | 4/2000 | Paul |
| 6,072,942 | A | 6/2000 | Stockwell et al. |
| 6,112,227 | A | 8/2000 | Heiner |
| 6,138,162 | A | 10/2000 | Pistriotto et al. |
| 6,161,130 | A | 12/2000 | Horvitz et al. |
| 6,167,435 | A | 12/2000 | Druckenmiller et al. |
| 6,173,311 | B1 | 1/2001 | Hassett et al. |
| 6,185,541 | B1 | 2/2001 | Scroggie et al. |
| 6,195,698 | B1 | 2/2001 | Lillibridge et al. |
| 6,199,102 | B1 | 3/2001 | Cobb |
| 6,216,127 | B1 | 4/2001 | Gans et al. |
| 6,226,684 | B1 | 5/2001 | Sung et al. |
| 6,249,805 | B1 | 6/2001 | Fleming, III |
| 6,266,692 | B1 | 7/2001 | Greenstein |
| 6,272,536 | B1 | 8/2001 | van Hoff et al. |
| 6,289,372 | B1 | 9/2001 | Vyaznikov |
| 6,341,316 | B1 | 1/2002 | Kloba et al. |
| 6,343,327 | B2 | 1/2002 | Daniels |
| 6,353,852 | B1 | 3/2002 | Nestoriak, III et al. |
| 6,367,075 | B1 | 4/2002 | Kruger et al. |
| 6,377,936 | B1 | 4/2002 | Henrick et al. |
| 6,381,631 | B1 | 4/2002 | van Hoff |
| 6,393,464 | B1 | 5/2002 | Dieterman |
| 6,421,709 | B1 | 7/2002 | McCormick et al. |
| 6,421,717 | B1 | 7/2002 | Kloba et al. |
| 6,430,608 | B1 | 8/2002 | Shaio |
| 6,438,584 | B1 | 8/2002 | Powers |
| 6,449,635 | B1 | 9/2002 | Tilden, Jr. |
| 6,463,462 | B1 | 10/2002 | Smith et al. |
| 6,546,416 | B1 | 4/2003 | Kirsch |
| 6,553,412 | B1 | 4/2003 | Kloba et al. |
| 6,640,301 | B1 | 10/2003 | Ng |
| 6,671,715 | B1 | 12/2003 | Langseth et al. |
| 7,039,949 | B2 * | 5/2006 | Cartmell et al. ................ 726/6 |
| 7,072,942 | B1 | 7/2006 | Maller |
| 7,146,009 | B2 | 12/2006 | Andivahis et al. |
| 7,249,175 | B1 * | 7/2007 | Donaldson ................ 709/225 |
| 2001/0042093 | A1 | 11/2001 | Shirai et al. |
| 2001/0051979 | A1 | 12/2001 | Aufricht et al. |
| 2002/0023135 | A1 | 2/2002 | Shuster |
| 2002/0026484 | A1 | 2/2002 | Smith |
| 2002/0032722 | A1 | 3/2002 | Baynes, Jr. et al. |
| 2002/0035607 | A1 * | 3/2002 | Checkoway et al. ......... 709/206 |
| 2002/0049610 | A1 | 4/2002 | Gropper |
| 2002/0052781 | A1 | 5/2002 | Aufricht et al. |
| 2002/0116463 | A1 | 8/2002 | Hart |
| 2002/0120496 | A1 | 8/2002 | Scroggie et al. |
| 2002/0143879 | A1 | 10/2002 | Sommerer |
| 2002/0152245 | A1 | 10/2002 | McCaskey et al. |
| 2002/0152272 | A1 | 10/2002 | Yairi |
| 2002/0198950 | A1 | 12/2002 | Leeds |
| 2002/0199095 | A1 | 12/2002 | Bandini et al. |
| 2003/0014414 | A1 | 1/2003 | Newman |
| 2003/0028580 | A1 | 2/2003 | Kucherawy |
| 2004/0015554 | A1 | 1/2004 | Wilson |
| 2004/0034694 | A1 | 2/2004 | Brown et al. |
| 2004/0049696 | A1 * | 3/2004 | Baker et al. ................ 713/201 |
| 2004/0122730 | A1 | 6/2004 | Tucciarone et al. |
| 2004/0153512 | A1 * | 8/2004 | Friend ........................ 709/206 |
| 2004/0205124 | A1 | 10/2004 | Limprecht et al. |
| 2004/0205133 | A1 | 10/2004 | Adler |
| 2004/0225572 | A1 * | 11/2004 | Tenenbaum et al. ........... 705/26 |
| 2004/0243847 | A1 * | 12/2004 | Way ........................ 713/201 |
| 2004/0258044 | A1 | 12/2004 | Girouard et al. |
| 2007/0204043 | A1 | 8/2007 | Espinosa et al. |

OTHER PUBLICATIONS

U.S. Appl. No. 10/619,726, filed Jul. 15, 2003, Steven J. Smith et al.
Article—"FloNetwork Inc., Prefer Network Team Up," www.emailuniverse.com/list-news/2000/10/18.html, Oct. 18, 2000, 1 page.
Press Release—"Responsys.com Introduces Responsys Interact 2.0 for Permission-Based Direction on the Internet," www.responsys.com/corporate/about/details_press.asp?id=10, dated Monday, Oct. 25, 1999, 3 pages.
Press Release—"L-Soft Announces Release of LSMTP™ Version 1.1b," www.1soft.com/news/lsmtp, dated Mar. 1, 1999, 2 pages.
Internet Article—"Eight Great Lists Call Topica Home," *The Leader in Email Discussions & Publishing Solutions*, www.topica.com/about/index.html?mode=eight, dated Jul. 26, 1999, 3 pages.
Chapman, D. B., "Majordomo: How I Manage 17 Mailing Lists Without Answering "request" Mail," *1992 Lisa VI*, Oct. 19-23, 1992—Long Beach, CA, pp. 135-143.

* cited by examiner

SYSTEMS AND METHODS FOR AUTOMATICALLY UPDATING ELECTRONIC MAIL ACCESS LISTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This application is related to the following co-pending applications which are hereby incorporated by reference in their entirety: SYSTEMS AND METHODS FOR AUTOMATICALLY UPDATING ELECTRONIC MAIL ACCESS LISTS, U.S. application Ser. No. 10/619,726, Inventors: Steven J. Smith et al., filed on Jul. 15, 2003. SYSTEMS AND METHODS FOR AUTOMATICALLY UPDATING ELECTRONIC MAIL ACCESS LISTS, U.S. application Ser. No. 10/721,044, Inventors: Steven J. Smith et al., filed on Nov. 21, 2003.

FIELD OF THE DISCLOSURE

The present disclosure relates to systems and methods for automatically updating electronic mail access lists.

BACKGROUND

Electronic mail (email) addresses are commonly provided by customers when interacting with a company's website. For example, customers often use their email address to serve as their login name, to receive an electronic receipt of a purchase, shipping updates, promotional materials and newsletter subscriptions. As is often the case, however, a customer's email address can fall into the hands of third party organizations that use it to deliver unsolicited email, or "spam".

Internet service providers (ISPs), email service providers (ESPs), and email software companies are employing various strategies to restrict and/or filter incoming email with the aim of reducing the amount of spam received by recipients. A side effect of such strategies is that legitimate email is often discarded, blocked or incorrectly deposited in "bulk mail" folders. As such, some solutions which block and/or filter email enable recipients to specify specific email senders that are allowed to bypass these protections. Such lists of explicitly enabled senders are often called "whitelists". Likewise, it is common to allow recipients to specify "blacklists"—lists of individual senders prohibited from sending email to the recipient. Email coming from blacklisted senders is automatically blocked, filtered, or restricted accordingly.

Manually maintaining whitelists and blacklists can represent a significant inconvenience on the recipient's part. Some systems require the recipient to separately open an application which manages their access lists and manually specify the sender's email address. Another approach requires that the recipient open the application which manages his or her access list and generate a special, unique tracking email address which circumvents the normal challenge/response mechanism. Some so-called "challenge/response" solutions put the burden of maintaining a recipient's whitelist on the senders themselves, by requiring previously unknown senders to authenticate themselves by responding to a "challenge" question designed to be only practically answerable by a human sender. Upon correctly answering the "challenge" question, the sender is deemed to be legitimate (by virtue of being a human sender rather than an automated system), and is added to the recipient's whitelist. However, this process will unwittingly filter out legitimate email that happens to have been sent by a mail program rather than by a person. From either the recipient's or the sender's perspective, a more convenient approach to managing email access lists is desired.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Figure 1:
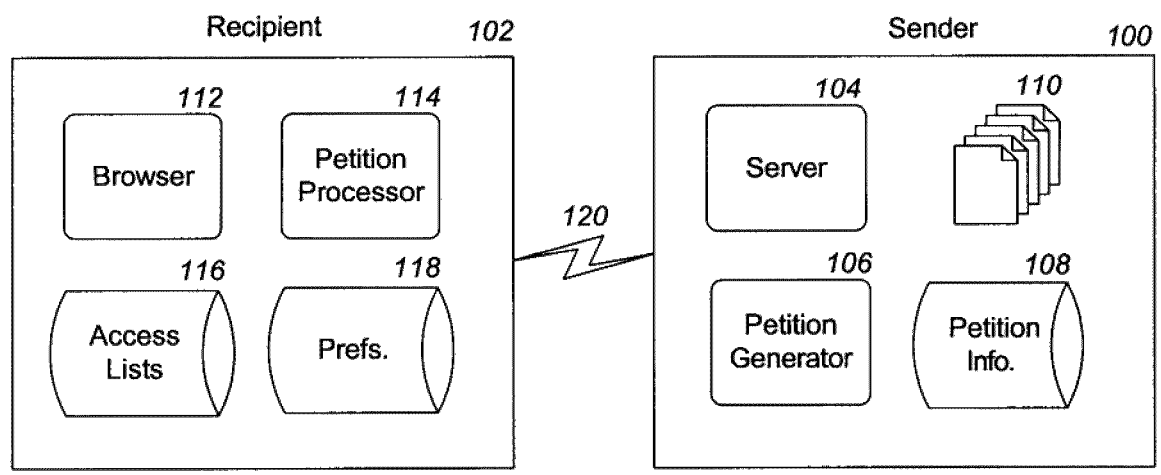
FIG. 1 is a system diagram illustrating one embodiment.

FIG. 1 is a block diagram illustrating an embodiment of the present invention. Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks.

Referring to FIG. 1., sender 100 includes server 104, access list petition generator 106 and petition information 108. By way of a non-limiting example, petition information (and any other information) can be stored and accessed through a number of means including but not limited to relational databases, digital files, random access memory, read-only memory, caches, and look-up tables. By way of a non-limiting example, the server can be a web server and/or application server. The server can accept HTTP (Hypertext Transfer Protocol) requests from various recipients and can provide Web pages 110 (e.g., files containing Hypertext Markup Language and possibly other information) in response. The petition generator can create an access list petition request (or "petition") and provide it to a recipient. In one embodiment, a petition can be used by the recipient for, among other things, to add the sender to the recipient's whitelist. The petition generator can utilize data from the petition information, the server, web pages and/or other sources to create a petition. In one embodiment, petition information can include descriptive information about the sender including identification information. Although the present disclosure is not limited by or restricted to any particular implementation, in one embodiment the petition generator logic can be incorporated partially or entirely into the server or into a web page (e.g., via JavaServer Pages™, available from Sun Microsystems, Inc. of Mountain View, Calif.).

Recipient 102 can include Web browser 112, petition processor 114, access list information 116, and user preferences information 118. The browser can display web pages provided by the server. In one embodiment, the browser is Microsoft Internet Explorer, available from Microsoft Corp. of Redmond, Wash. The petition processor processes petitions produced by the petition generator. In one embodiment, a petition is provided to the web browser, which then provides it to the petition processor. In processing the petition, the petition processor can utilize the access list, user preferences information and other information pertaining to security settings/polices for an email client or email provider. The access list information can include one or more whitelists and/or one or more blacklists. User preferences can include security polices and run-time settings that dictate how the petition processor operates. In one embodiment, the petition processor can be incorporated partially or entirely into an email client program (not shown) such as Microsoft Outlook™, available from Microsoft Corp. of Redmond, Wash. In another embodiment, the petition processor can be incorporated into a challenge/response mechanism (not shown) such as "Mailblocks", available from Mailblocks, Inc. of Los Altos, Calif. It is important to note, however, that the present disclosure is not limited to any particular email client program, challenge/response mechanism, or any other type of mail program and/or spam filter. Furthermore, the present disclosure is not limited to any particular email protocol or email address format.

The recipient and the sender may reside on the same computing device or on different computing devices. By way of a non-limiting example, a computing device can include a personal computer, portable computer, personal digital assistant, mobile phone, wearable digital device, wrist watch, digital music player and a mainframe computer. Recipients and senders can communicate over communication link 120. In one embodiment the communication link may include one or more networks (e.g., the Internet, Wide Area Network, Local Area Network, wireless network, and satellite network). In another embodiment, the communication link can be realized as shared memory (e.g., random access memory and read-only memory), a shared object/data structure, a file system, a distributed object (e.g., a JavaBean, CORBA object, .Net Object, and a Web service), and/or an inter-processor data conduit in a multi-processor (e.g., parallel) computer. In another embodiment, the communication link can be based on any combination of the above embodiments. Although this disclosure is not limited by or restricted to using a particular communication protocol, one embodiment allows the recipient and the sender to communicate using HTTP over the Internet.

Figure 2:
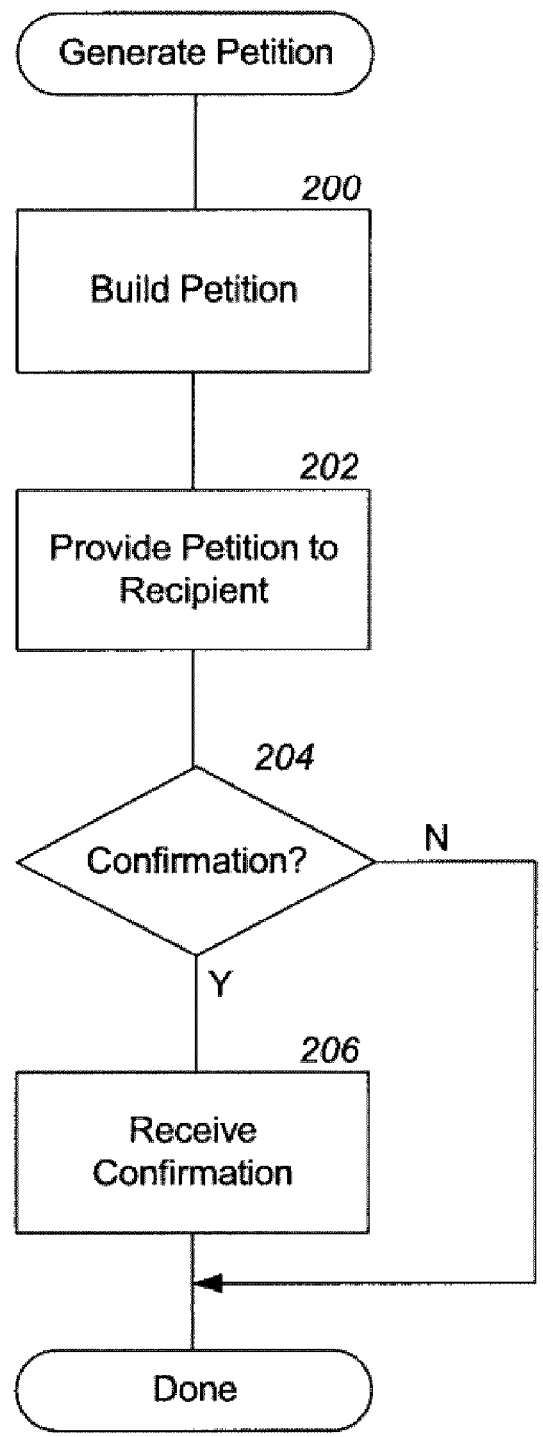
FIG. 2 is a flow chart illustrating petition generation in one embodiment.

FIG. 2 is a flow chart illustrating petition generation in one embodiment. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

A sender can utilize a petition generator to create a petition that will (potentially) allow the sender to add itself to a recipient's whitelist. In one embodiment, this can happen as a result of receiving the recipient's email address. By way of a non-limiting example, the recipient's email address can be obtained by the sender in conjunction with a Web-based purchase (i.e., a purchased transacted over the World Wide Web), a newsletter subscription, etc. In Step 200, the petition generator uses the recipient's email address in concert with data drawn from the petition information to produce a petition. Petition information can include the sender's descriptive information (e.g., name, description, address, etc.), identification methods and confirmation information. These will be discussed below. The petition information can also keep track of whether or not a particular recipient has added the sender to their whitelist (e.g., whether or not a petition was accepted by a given recipient). In such a case, the sender need not generate a petition.

For discussion purposes, a petition will be illustrated as plain text. However, the present disclosure is not limited by or restricted to any particular representation. Suitable representations include but are not limited to, plain text, XML (eXtensible Markup Language), binary data, encrypted data, and/or any combination of these. In one embodiment, a petition can include lines of text wherein each line includes an element name and one or more associated values. The format of petition data is flexible and extensible. Minimally, it can consist of the recipient's email address, the sender's name, and the sender's identification method and/or credentials. By way of a non-limiting example, such a petition might appear as follows (wherein colons separate elements from corresponding values):

Recipient: steve@xyzcompany.com
Sender: City Tribune Newspaper
Identification: from-address newsletter@citytribunepaper.com In this example, the recipient element has email address "steve@xyzcompany.com" as its value. This element specifies the email address that the sender is petitioning for permission to use. The sender element identifiers the sender as "City Tribune Newspaper". In one embodiment, a petition can contain a plurality of sender elements. By way of a non-limiting example, such a situation may arise if a sender is petitioning for inclusion on the recipient's whitelist on behalf of itself and other senders.

A recipient may require that a sender support one or more sender identification methods which are used by the recipient to verify that an email message is from the given sender. Senders tell the recipient which methods they support through the identification element. In the above example, the identification method is "from-address"That is, email from City Tribune Newspaper is verified when the email header "From" address equals "newsletter@citytribunepaper.com". This is a simple but potentially inadequate method for identifying senders since the "From" address is easily forged. But the present invention is not limited by or restricted to any particular identification method. As new and improved identification methods are developed, they can be included in the petition without impairing the operation of existing verification methods.

By way of a non-limiting example, consider the following petition:
Recipient: steve@xyzcompany.com
Sender: City Tribune Newspaper Identification: from-address newsletter@citytribunepaper.com
Identification: header-password 294305828
Identification: IP-address 192.168.5.0 255.255.255.0
Identification: public-key F349SBF28ZKFWO In this example, the sender has specified four identification methods. The first method ("from-address") was discussed above. The "header-password" method specifies a password ("294305828") that the sender will include with the header portion of an email message sent to the recipient. In one embodiment, the password can be assigned to the sender by the recipient and provided to the recipient via a confirmation (see below). Another way to identify a sender is by its Internet Protocol (IP) address. The "IP-address" identification method allows a sender to specify an IP address and subnet mask address which identifies a range of source IP addresses from which it will send mail to the recipient. A more secure identification method than those already discussed is the use of public-key encryption technology to digitally "sign" an email message. The "public-key" identification method allows a sender to specify a public key ("F349SBF28ZKFWO") which can be used by the recipient to decrypt a digital signature accompanying the sender's email. By way of a non-limiting example, if the value of the decrypted signature equals the value of the email header produced by a message digest algorithm, the sender's identity is verified.

Additional petition elements are possible since the format of a petition is flexible and naturally extensible. Such elements can include sender contact information (e.g., postal address, telephone number, Web page address, etc.), the sender's business category (e.g., retail, non-profit organization, entertainment, etc.), the nature of the sender's email (e.g., newsletter, promotions, transaction receipts, shipping updates, etc.), a description of the sender, and instructions to the recipient regarding confirmation of the outcome of the petition. By way of a non-limiting example, consider the following petition:

Recipient: steve@xyzcompany.com
Sender: City Tribune Newspaper
Identification: from-address newsletter@citytribunepaper.com
Identification: header-password 294305828
Identification: IP-address 192.168.5.0 255.255.255.0
Identification: public-key F349SDF28ZKFWO=
Description: Daily email version of the City Tribune newspaper
Sender-category: Media
Sender-email-category: newsletter
Petition-success: URL http://wwwwwww
Petition-denied: URL http://xxxxxxx
Petition-success: URL http://yyyyyy
Petition-denied: URL http://zzzzzz In this example, the sender has included a description of itself in the petition ("Daily email version of the City Tribune newspaper"). The sender has also specified that its business category is "Media" and that the nature of its email to the sender is "newsletter". In one embodiment, if a recipient accepts a sender's identification method(s), then the recipient implicitly trusts that the sender is not misusing the Sender-category and Sender-email-category elements in order to increase the likelihood that the sender will be added to the recipient's email access list. The petition may also optionally include instructions for the petition processor to communicate a confirmation of the outcome of the petition (e.g., whether the sender was added to the recipient's whitelist or not) back to the petition generator so that the recipient's email address may be appropriately dealt with by the sender. A sender, by way of a non-limiting example, may wish to disallow finalization of registration on its website in cases where the recipient does not accept the sender's petition. The instructions for confirmation can include the method for confirmation of the outcome and details of how to execute the confirmation. The petition format is extensible such that new methods may be used as they are made available. In addition, the petition format also allows multiple confirmation methods to be specified for the same sender, allowing for backward-compatibility as new confirmations methods are deployed.

In one embodiment, a confirmation method allows the recipient to access a URL (Uniform Resource Locator) on the sender's server which has been pre-configured by the sender to affect the desired action for the given result. In the example above, the sender has specified two pairs of confirmation methods:

Petition-success: URL http://wwwwwww
Petition-denied: URL http://xxxxxxx
Petition-success: URL http://yyyyyy
Petition-denied: URL http://zzzzzz Each pair specifies a URL for the recipient to access upon acceptance of the petition ("Petition-success") and rejection of the petition ("Petition-denied"). In the case where the petition is accepted, the recipient will access URLs http://wwwwwww" and "http://yyyyyy". In the case where the petition is rejected, the recipient will access URLs "http://xxxxxxx" and "http://zzzzzz".

The petition processor may be configured to not honor some or all requests for confirmation, based on user preferences, security policies determined by an email client provider or an email service provider, or due to programming simplifications in the design of the petition processor.

The present disclosure is not limited by or restricted to any particular confirmation method. As new confirmation techniques are developed, they can be integrated into petitions using the Petition-success and Petition-denied elements while maintaining backwards compatibility with existing confirmation methods.

Referring again to FIG. 2., in Step 202 the petition generator automatically provides the petition to the recipient. In one embodiment, the petition generator provides the petition to the server. The server tags the petition data with a specially designated MIME (Multi-purpose Internet Mail Extension) type and sends it to the recipient web browser via the HTTP protocol. The browser can be configured to associate the specially designated MIME type with the petition processor. This association can be configured upon installation of the petition processor so as to not require additional manual configuration by the recipient. Upon receipt of a petition, the web browser automatically provides it to the petition processor. The web browser can also automatically launch the petition processor if it is not already running. In another embodiment, the petition processor can be configured as a web browser "plug-in".

In another embodiment, the petition can be associated with an object, such as an image in the web page provided to the browser by the server. The web page can include JavaScript (or other code) which, when executed by the browser, can determine if the recipient's browser supports the specially-designated MIME type. If not, the JavaScript can prevent the image from being rendered. Otherwise, the image can be rendered and the petition data associated with it provided to the petition processor. In another embodiment, the petition can be requested as a result of a redirection of an initial confirmation page to a new URL. One method of accomplishing such a redirection is by using the "meta" HTML tag:

```
<meta HTTP-EQUIV="refresh"
CONTENT="5;URL=http://www.sendersite.com/cgi-bin/petreq.pl">
```

In a further embodiment, the petition may be sent as an additional URL specified in a separate frame in an HTML page, or in a separate window.

Step 204 determines whether the sender will receive confirmation of the petition from the recipient. If the petition generator did not include conformation instructions (see Step 200) in the petition, the process concludes. Otherwise, confirmation of the success or denial of the petition by the recipient can be automatically provided to the sender in Step 206 if the petition processor chooses to do so. In one embodiment, if confirmation was requested by the sender but never received, the sender can assume that the petition was denied by the recipient.

Figure 3:
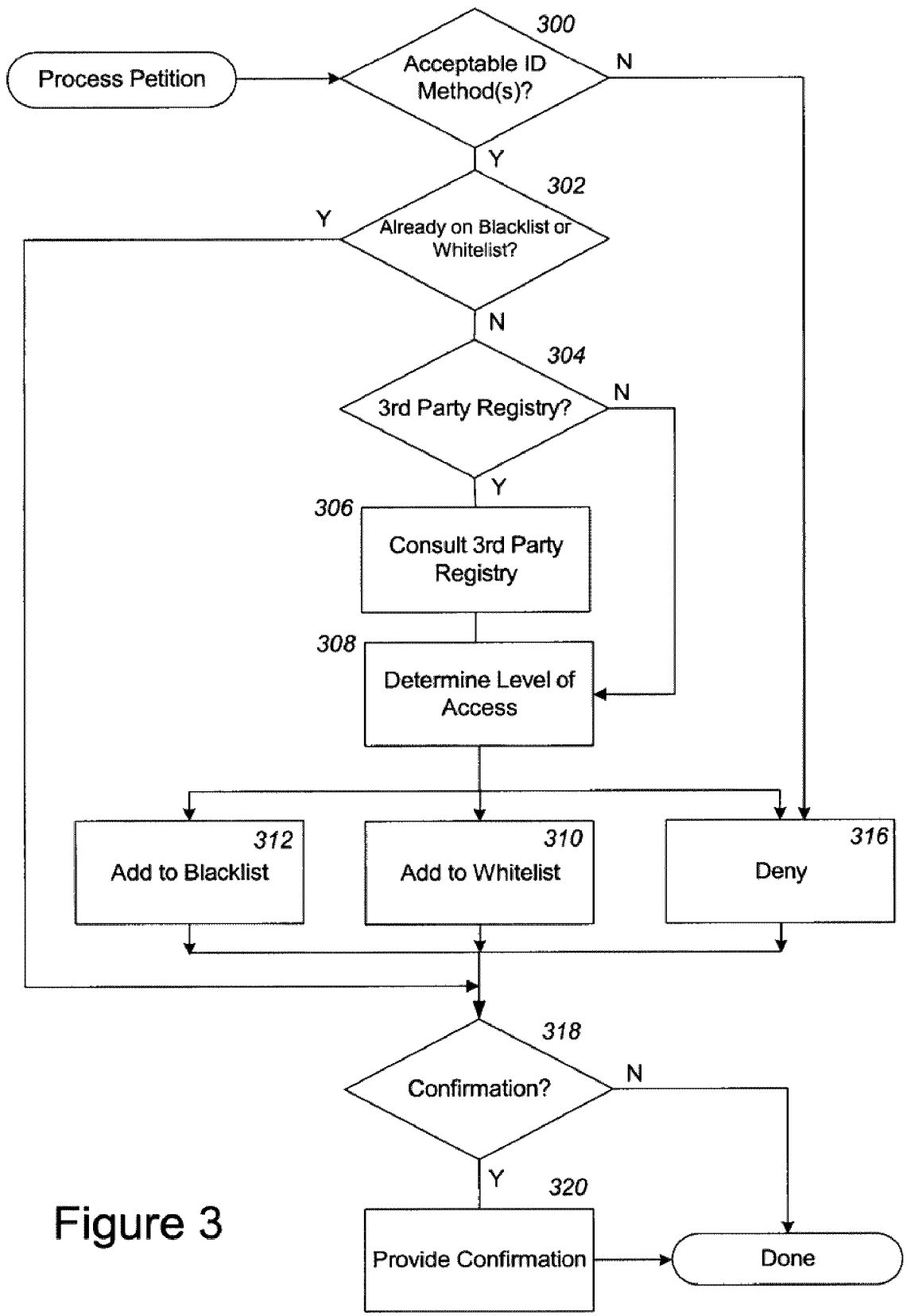
FIG. 3 is a flow chart illustrating petition processing in one embodiment.

FIG. 3 is a flow chart illustrating petition processing in one embodiment. Although this figure depicts functional steps in a particular order for purposes of illustration, the process is not limited to any particular order or arrangement of steps. One skilled in the art will appreciate that the various steps portrayed in the figure could be omitted, rearranged and/or adapted in various ways.

In Step 300, a determination is made as to whether there are acceptable identification method(s) in the petition. The user preferences information can specify the identification method(s) that are required of potential senders. In one embodiment, the required identification method(s) can be articulated as an expression that is evaluated dynamically against elements and values in the petition. By way of a non-limiting example:

```
(from-address AND header-password AND IP-address) OR (from-
    address AND public-key).
```

The identification method expression above declares that a petition must support either from-address, header-password, and IP-address, or from-address and public-key identification methods. This feature allows a flexible approach to identity verification. In another embodiment, the user preferences information can include rules that can be used to dynamically determine the identification methods required based on information in the petition. In one embodiment, rules can be specified in a natural language.

If the petition does not support the required identification method(s), the petition is denied in Step 316. Next, in Step 318 it is determined whether or not the sender requires a confirmation. If confirmation is required, it is provided in Step 320. Otherwise, processing concludes.

In Step 302, a determination is made regarding whether or not the sender (as identified by an acceptable identification method) is already on an email access list. If this is the case, no action will be taken. Processing continues at Step 318 which determines whether or not the sender requires confirmation. If confirmation is required, it is provided in Step 320 according to the instructions in the petition.

In one embodiment, if the sender is not currently on an access list, the recipient end-user can be prompted for input regarding whether to grant access to the sender based upon the petition. In one embodiment, the prompt can allow the end-user to choose whether to add the sender to a whitelist, a blacklist or to simply deny the petition. In another embodiment, the prompt can allow the user to discover if the sender is listed in a third party registry of trusted senders. User preferences and/or security policies determined by the email client vendor or email service provider can specify whether the end-user should always be prompted, never be promoted, or only prompted sometimes (based on rules that are dynamically evaluated against information in the petition). In one embodiment, rules can be specified in a natural language. By way of a non-limiting example, consider the following rule:

```
if (Sender not equal "Amazon.com" OR
    Identification = from-address) then
    prompt user.
```

This rule states that if the Sender is not Amazon.com or the sender's identification method is only "from-address", then the recipient end-user will be prompted as to what action to take.

If the sender is not already on an access list, processing continues at Step 304. Step 304 determines based on user preferences whether or not to consult one or more third-party registries of trusted senders. In one embodiment, a third party registry can be provided by TRUSTe of San Francisco, Calif. This information may either be provided to the recipient end-user for consideration when determining whether to grant access, or used by the petition processor directly to automatically make access granting decisions without recipient consultation. In one embodiment, this behavior can be configured as a user preference. User preferences and/or security policies determined by the email client vendor or email service provider can specify whether third-party registries should always, never or sometimes be consulted (based on rules that are dynamically evaluated against information in the petition). In one embodiment, rules can be specified in a natural language. By way of a non-limiting example, consider the following rule:

```
if (Identification = public-key) AND
    (Sender in registry ("TRUSTe")) then
    add sender to whitelist.
else
    Prompt_user;
```

This rule states that if the sender is identified with a public key and the sender is contained in the "TRUSTe" third party registry, the sender can be added to the whitelist without prompting, otherwise the recipient should be prompted to make the determination of how the sender should be handled. If such registries are to be consulted, this can take place in Step 306. Otherwise, processing continues at Step 308.

Step 308 determines the level of access that will be provided to the sender based on the information in the petition, any end-user input, and any input from third party registries. If in response to a prompt, the end-user specified that the sender should be included on the whitelist, such is accomplished in Step 310. If in response to a prompt, the end-user specified that the sender should be included on the blacklist, such is accomplished in Step 312. If in response to a prompt, the end-user specified that the petition should simply be denied, this is accomplished in Step 316. If there was no end-user input, rules in the user preferences information can be consulted regarding what action to take. These so-called action rules can be dynamically evaluated against the results of consulting third-party registries and the information contained in the petition. In one embodiment, rules can be specified in natural language. By way of a non-limiting example, consider the following four rules:

(1) If (Sender-category=pornography) then add sender to blacklist.
(2) If (Sender identification method=public-key) and Sender in third-party registry, then add Sender to whitelist.
(3) If (Sender in third-party known spammer list) then add sender to blacklist.
(4) Default: Prompt_user;

In the above example, rule (1) specifies that if the sender category is pornography, automatically add the sender to the blacklist regardless of any other information in the petition. Rule (2) specifies that if the sender is identified by public-key encryption and is in a third-party registry of trusted senders, add the sender to the whitelist. Rule (3) specifies that if the sender is in a third-party list of known spammers, add the sender to the black list. Finally, a default rule (4) specifies that if no other rule applies, prompt the user to determine how to handle the petition.

Processing continues at Step 318 which determines whether or not the sender requires confirmation. If confirmation is required and the petition processor chooses to allow it, it is provided in Step 320 according to the instructions in the petition.

Web-based email providers, such as Hotmail (http://www.hotmail.com) or Yahoo (http://www.yahoo.com) introduce an environment where a recipient's access lists are located on the remote systems of the web mail provider rather than on the recipient. As such, a petition processor on the recipient will need to read and modify access information on the mail provider. This situation is addressed by the system of FIG. 4.

Figure 4:
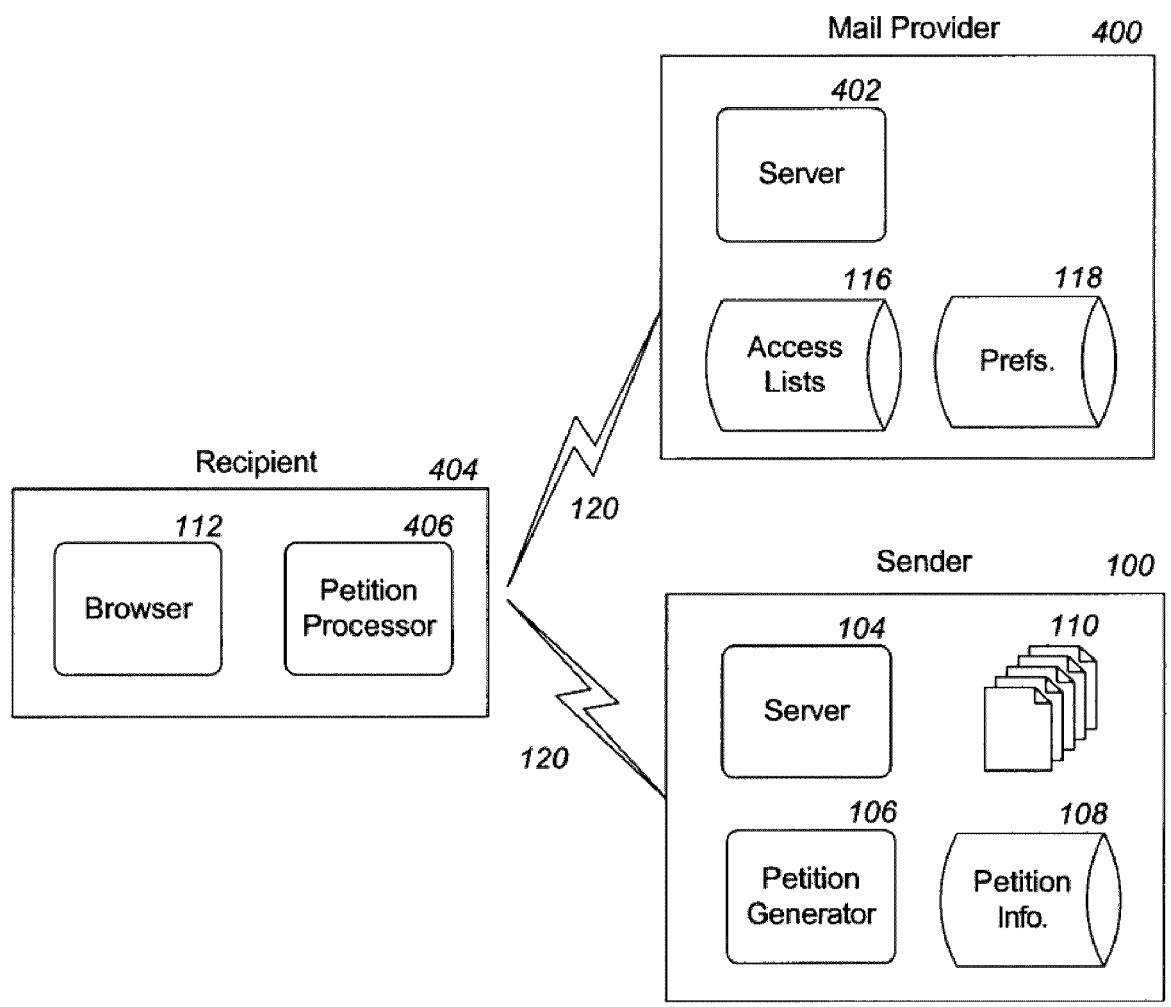
FIG. 4 is system diagram of an embodiment including a remote mail provider.

FIG. 4 is system diagram of an embodiment including a remote mail provider. Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks.

Referring to FIGS. 1 and 4, sender 100 includes server 104, petition generator 106, petition information 108 and web pages 110. Mail provider 400 includes server 402, access list information 116, and user preferences information 118. By way of a non-limiting example, the mail provider can support one or more of the following email protocols: SMTP, MIME, POP and IMAP. Recipient 404 includes web browser 112 and petition processor 406. A request to add the sender to the mail provider's email access list begins with the recipient's email address being provided to the sender. Based on this email address and the petition information, the petition generator produces a petition which is automatically provided to the recipient's petition processor. In order to process the petition, the petition process needs to read and update the access lists and user preferences information. However, unlike the system of FIG. 1, this information is no longer local to the recipient. In one embodiment, a simple request/reply protocol can used to exchange this information between the petition processor and the mail provider. By way of a non-limiting example, the petition processor can send requests to the mail provider that identify a data source (e.g., whitelist, blacklist, user preferences, etc.) and an operation to take on that data source (e.g., read, update, delete, etc.). The mail provider can respond with the appropriate data and/or a confirmation of the operation.

Figure 5:
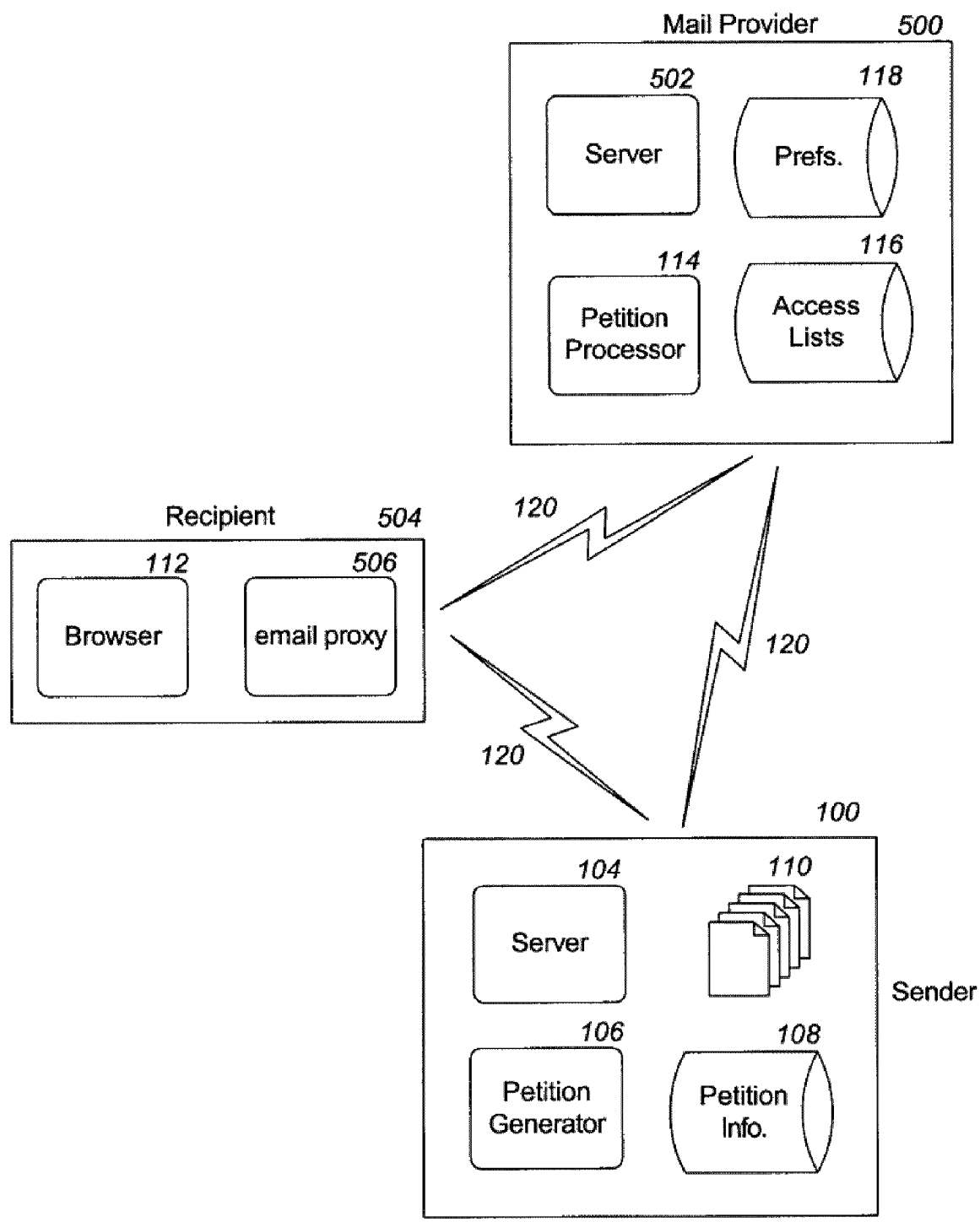
FIG. 5 is system diagram of an embodiment including a remote mail provider.

However, if the petition processor is also located on the mail provider, a different approach can be taken. FIG. 5 is system diagram of an embodiment including a remote mail provider. Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks.

Referring to FIGS. 1 and 5, sender 100 includes Web/application server 104, petition generator 106, petition information 108 and web pages 110. Mail provider 500 includes server 502, petition processor 114, access lists 116, and user preferences information 118. Recipient 504 includes Web browser 112 and email proxy 506. The proxy is associated with the petition MIME type such that when a petition is received by the browser, the browser automatically provides it to the proxy. The proxy then automatically forwards the petition to the mail provider petition processor. In one embodiment, Yahoo! Default Email Application, available from Yahoo (http://www.yahoo.com), can serve as the proxy. The petition processor can use the web browser as its GUI for recipient end-user interaction (e.g., prompts). Petition confirmations need not communicate with the recipient, and may be made directly from the petition processor on the mail provider to the petition generator on the sender.

Figure 6:
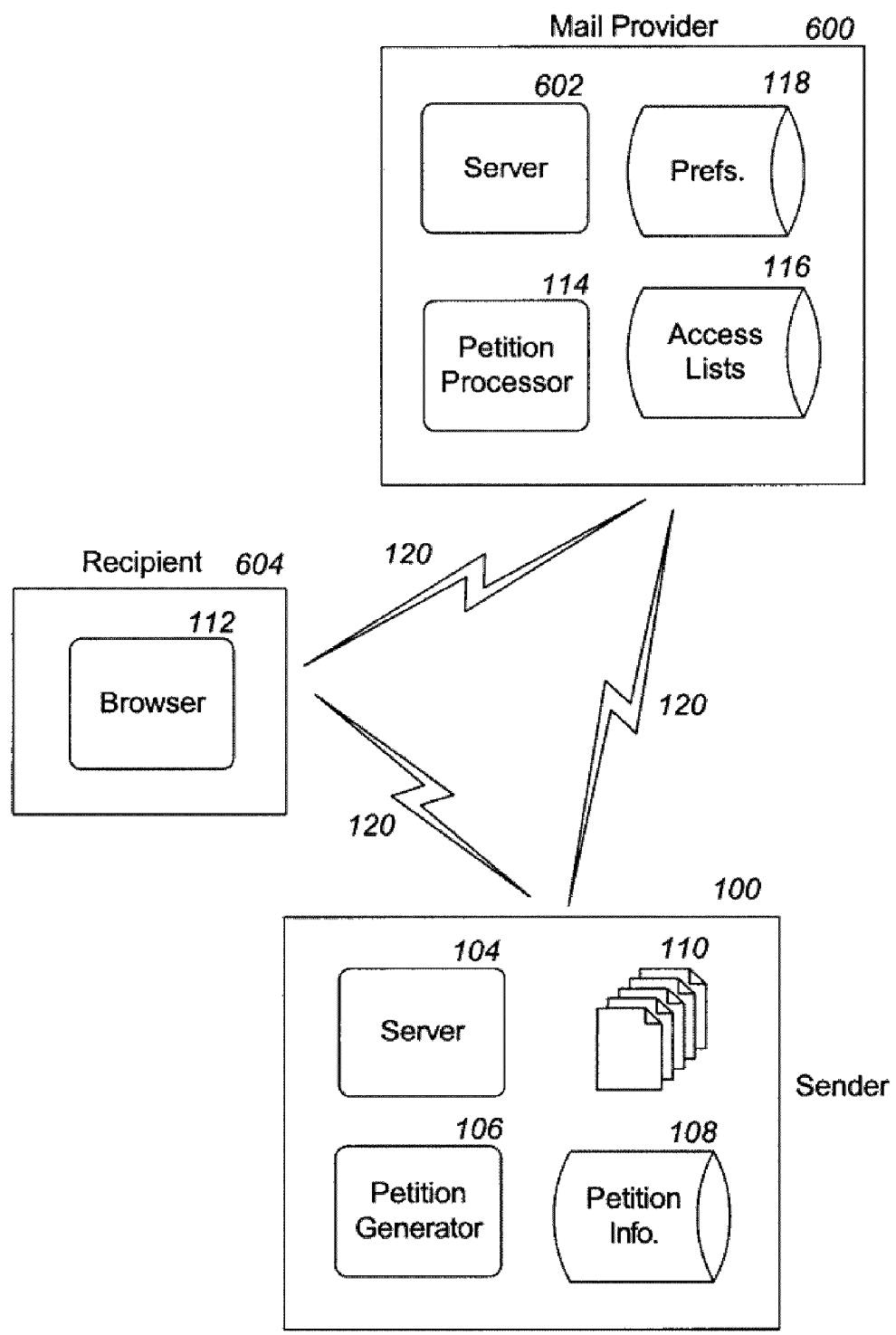
FIG. 6 is system diagram of an embodiment including a remote mail provider.

FIG. 6 is another system diagram of an embodiment including a remote mail provider. Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks.

Referring to FIGS. 1 and 6, sender 100 includes Web/application server 104, petition generator 106, petition information 108 and web pages 110. Mail provider 600 includes server 602, petition processor 114, access lists 116, and user preferences information 118. Recipient 604 includes Web browser 112. The petition processor is invoked via the recipient's web browser when it accesses a special URL on the mail provider's server, where part of the URL is the Internet location of the petition processor, and part of the URL is an encoded version of the petition data. The part of the URL containing the Internet location of the petition processor can be stored in a variable or object accessible with JavaScript or another web page scripting language, and the part of the URL containing the encoded petition data can be generated by the petition generator as part of an HTML confirmation page (e.g., as provided by the sender's server to the recipient's browser). The HTML confirmation page can also contain Javascript or another web page scripting language to check for the presence of such a petition processor URL, and if it exists, add the encoded petition data, and cause the browser to access the petition processor URL. Such an access can take place in a variety of ways, including but not limited to, in a separate frame, in a separate window, or as a redirection of the existing window.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for permitting a sender to provide electronic mail (email) to a recipient, said method comprising:
   providing a recipient email address from the recipient to a potential sender as part of a subscription request;
   generating a petition for requesting of the recipient that the potential sender be allowed to send email to the recipient, said petition including descriptive information that will be used to identify the potential sender during future email transmission between the potential sender and the recipient, wherein the petition is generated as a result of receiving the recipient email address to the potential sender during the subscription request;
   transmitting said petition from the potential sender to the recipient via a hypertext transfer protocol wherein the petition is transmitted as a web browser-based interaction before exchanging email messages between the potential sender and the recipient as a result of said subscription request;
   receiving the petition by the recipient and processing said petition;
   determining whether the petition is acceptable based on at least one of: 1) a sender identity verification method; 2) user input; and 3) third party information;
   adding the potential sender to an email access list if the petition is acceptable and denying the petition if the petition is determined to be unacceptable; and
   wherein the email access list is used to determine whether or not an email message from the potential sender is permitted to reach the recipient in the event that the potential sender transmits the email message to the recipient.

2. The method of claim 1, further comprising:
   providing confirmation of the determination to the sender if the sender requested such confirmation.

3. The method of claim 1, wherein:
   the step of providing the recipient email address to the sender is a result of a Web-based interaction between the recipient and the sender.

4. The method of claim 1, wherein:
   the sender identity verification method is used by the recipient to verify that an email message is from the sender.

5. The method of claim 1, wherein:
   the sender identity verification method is one of: 1) an email header "From" address; 2) a password; 3) an Internet Protocol (IP) address; and 4) a digital signature.

6. The method of claim 1, wherein:
   the petition is provided to a Web browser.

7. The method of claim 6 wherein:
   the Web browser identifies the petition based on a Multi-purpose Internet Mail Extension (MIME) type.

8. The method of claim 1 wherein:
   the step of determining whether the petition is acceptable utilizes at least one rule, wherein the at least one rule is evaluated against the petition.

9. The method of claim 1, further comprising:
   prompting a user for a decision regarding whether or not to accept the petition.

10. The method of claim 1 wherein the petition includes information identifying a plurality of senders such that the sender generates the petition on behalf of the sender and on behalf of one or more other senders.

11. The method of claim 1, further comprising:
    transmitting a confirmation of an outcome of the petition from the recipient to the sender after the petition has been evaluated, said confirmation specifying whether the sender has been added to the email access list.

12. The method of claim 1 wherein a format of the petition is extensible to include additional elements and identification methods.

13. The method of claim 1, wherein the petition is used by the potential sender to specify an identification method that it will employ to identify itself in the future when it sends an email message to the recipient.

14. The method of claim 1, wherein the petition is used to specify an IP address and subnet mask address which identifies a range of source IP addresses from which the potential sender will send email to the recipient.

15. The method of claim 1, wherein the petition is used to specify a public key which will be used by the recipient to decrypt a digital signature accompanying a potential sender's email message.

16. A method for permitting a sender to provide electronic mail (email) to a recipient, said method comprising:

providing a recipient email address from the recipient to a potential sender as part of a subscription request;

generating a petition requesting of the recipient that the potential sender be allowed to send email to the recipient, wherein the petition includes a sender identity verification method, the petition generated as a result of receiving the recipient email address to the sender;

transmitting the petition from the potential sender to the recipient via hypertext transfer protocol wherein the petition is transmitted as a web browser-based interaction before exchanging email messages between the potential sender and the recipient as a result of said subscription request;

receiving the petition at the recipient and processing the petition;

determining whether the petition is acceptable based on at least one of: 1) the sender identity verification method; 2) user input; and 3) third party information; and adding the potential sender to an email access list if the petition is acceptable; and wherein the email access list is used to determine whether or not email from the potential sender is permitted to reach the recipient in the event that the potential sender transmits the email to the recipient.

17. The method of claim 16, further comprising:
providing confirmation of the determination to the sender if the sender requested such confirmation.

18. The method of claim 16 wherein:
the step of providing the recipient email address to the sender is a result of a Web-based interaction between the recipient and the sender.

19. The method of claim 16 wherein:
the sender identity verification method is used by the recipient to verify that an email message is from the sender.

20. The method of claim 16 wherein:
the identity verification method is one of: 1) an email header "From" address; 2) a password; 3) an Internet Protocol (IP) address; and 4) a digital signature.

21. The method of claim 16 wherein:
the petition is provided to a Web browser.

22. The method of claim 21 wherein:
the Web browser identifies the petition based on a Multipurpose Internet Mail Extension (MIME) type.

23. The method of claim 16 wherein:
the step of determining whether a petition is acceptable utilizes at least one rule, wherein the at least one rule is evaluated against the petition.

24. The method of claim 16, further comprising:
prompting a user for a decision regarding whether or not to accept the petition.

25. A system comprising:

means for providing a recipient email address from the recipient to a potential sender as part of a subscribe request;

means for generating a petition for requesting of the recipient that the potential sender be allowed to send email to the recipient, said petition including descriptive information that will be used to identify the potential sender during future email transmission between the potential sender and the recipient, wherein the petition is generated as a result of receiving the recipient email address to the potential sender during the subscription request;

means for transmitting said petition from the potential sender to the recipient via a hypertext transfer protocol wherein the petition is transmitted as a web browser-based interaction before exchanging email messages between the potential sender and the recipient as a result of said subscription request;

means for receiving the petition by the recipient and processing said petition;

means for determining whether the petition is acceptable based on at least one of: 1) a sender identity verification method; 2) user input; and 3) third party information;

means for adding the potential sender to an email access list if the petition is acceptable and denying the petition if the petition is determined to be unacceptable; and wherein the email access list is used to determine whether or not an email message from the potential sender is permitted to reach the recipient in the event that the potential sender transmits the email message to the recipient.

26. A system for adding a sender to an electronic mail (email) access list for a recipient, said system comprising:

the recipient including:

a petition processor to accept a petition, determine whether the petition is acceptable based on at least one of: 1) a sender identity verification method; 2) user input; and 3) third party information; and modify an access list based on the petition if the petition is determined to be acceptable wherein the petition is transmitted as a web browser-based interaction before exchanging email messages between the sender and the recipient as a result of said subscription request;

a browser to accept the petition from the sender via hypertext transfer protocol and automatically provide the petition to the petition processor; and wherein the access list determines if the sender is permitted to provide email to the recipient;

the sender including:

a server that receives a recipient email address from the recipient during a subscription request; and a petition generator coupled to the server, the petition generator to produce a petition as a result of receiving the recipient email address to the sender, said petition including descriptive information that will be used to identify the sender during future email transmission between the sender and the recipient.

27. The system of claim 26 wherein:
the petition processor provides a confirmation to the sender.

28. The system of claim 26 wherein:
the petition processor executes on a first computing device;
the access list is maintained on a second computing device; and
wherein the first computing device and the second computing device are not the same.

29. The system of claim 26 wherein:
the access list is accessible to the petition processor through a remote mail provider that is distinct from the recipient.

30. The system of claim 26 wherein:
the petition includes a sender identity verification method that is used by the recipient to verify that an email message is from the sender.

31. The system of claim 30 wherein:
the sender identification method is one of: 1) an email header "From" address; 2) a password; 3) an Internet Protocol (IP) address; and 4) a digital signature.

32. The system of claim 26 wherein:
the browser identifies the petition based on a Multipurpose Internet Mail Extension (MIME) type.

33. The system of claim 26 wherein:
the petition processor determines whether or not to accept a petition and add the sender to the email access list of the recipient.

34. The system of claim 33 wherein:
such determination is based on at least one of: 1) input from a user; 2) a sender identity verification method included in the petition; and 3) third party information.

35. The system of claim 26 wherein:
the server provides the petition to the browser.

36. A computer readable storage medium having instructions stored thereon, which instructions when executed by one or more processors cause a system to:
provide a recipient email address from the recipient to a potential sender as part of a subscription request;
generate a petition for requesting of the recipient that the potential sender be allowed to send email to the recipient, said petition including descriptive information that will be used to identify the potential sender during future email transmission between the potential sender and the recipient, wherein the petition is generated as a result of receiving the recipient email address to the potential sender during the subscription request;
transmit said petition from the potential sender to the recipient via a hypertext transfer protocol wherein the petition is transmitted as a web browser-based interaction before exchanging email messages between the potential sender and the recipient as a result of said subscription request;
receive the petition by the recipient and processing said petition;
determine whether the petition is acceptable based on at least one of: 1) a sender identity verification method; 2) user input; and 3) third party information;
add the potential sender to an email access list if the petition is acceptable and deny the petition if the petition is determined to be unacceptable; and
wherein the email access list is used to determine whether or not an email message from the potential sender is permitted to reach the recipient in the event that the potential sender transmits the email message to the recipient.

37. The computer readable storage medium of claim 36 wherein:
providing the recipient email address to the sender is a result of a Web-based interaction between the recipient and the sender.

38. The computer readable storage medium of claim 36 wherein:
the sender identity verification method is used by the recipient to verify that an email message is from the sender.

39. The computer readable storage medium of claim 36 wherein:
the sender identity verification method is one of: 1) an email header "From" address; 2) a password; 3) an Internet Protocol (IP) address; and 4) a digital signature.

40. The computer readable storage medium of claim 36 wherein:
the petition is provided to a Web browser.

41. The computer readable storage medium of claim 36 wherein:
the Web browser identifies the petition based on a Multipurpose Internet Mail Extension (MIME) type.

42. The computer readable storage medium of claim 36 wherein:
the step of determining whether the petition is acceptable utilizes at least one rule, wherein the at least one rule is evaluated against the petition.

43. The computer readable storage medium of claim 36, further comprising instructions to cause the system to:
prompt a user for a decision regarding whether or not to accept the petition.

44. The computer readable storage medium of claim 36 wherein the petition includes information identifying a plurality of senders such that the sender generates the petition on behalf of the sender and on behalf of one or more other senders.

45. The computer readable storage medium of claim 36, further comprising instructions to cause the system to:
transmitting a confirmation of an outcome of the petition from the recipient to the sender after the petition has been evaluated, said confirmation specifying whether the sender has been added to the email access list.

46. The computer readable storage medium of claim 36 wherein a format of the petition is extensible to include additional elements and identification methods.

* * * * *

UNITED STATES PATENT AND TRADEMARK OFFICE
CERTIFICATE OF CORRECTION

PATENT NO. : 7,657,599 B2
APPLICATION NO. : 10/447593
DATED : February 2, 2010
INVENTOR(S) : Steven J. Smith It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1557 days.

Signed and Sealed this

Thirtieth Day of November, 2010

David J. Kappos
*Director of the United States Patent and Trademark Office*